United States Patent [19]
Ichii et al.

[11] Patent Number: 5,835,537
[45] Date of Patent: *Nov. 10, 1998

[54] MULTIPLE TRANSMISSION APPARATUS

[75] Inventors: Eiji Ichii; Hiroo Moriue; Yutaka Matsuda, all of Hiratsuka; Hiroaki Sakamoto, Aki-gun; Yoshikazu Nobutoki, Hiroshima, all of Japan

[73] Assignee: The Furukawa Electric Co., Ltd., Tokyo, Japan

[ * ] Notice: The term of this patent shall not extend beyond the expiration date of Pat. No. 5,513,175.

[21] Appl. No.: 415,080

[22] Filed: Mar. 30, 1995

[30] Foreign Application Priority Data

Apr. 4, 1995 [JP] Japan ................................ 6-065888

[51] Int. Cl.⁶ .......................... H04L 27/04; H04J 3/14
[52] U.S. Cl. .......................... 375/295; 370/251; 455/343; 340/825.16
[58] Field of Search ................................ 375/259, 377, 375/295; 370/17, 85.1; 340/825.06, 825.16; 455/343

[56] References Cited

U.S. PATENT DOCUMENTS

| | | | |
|---|---|---|---|
| 4,942,571 | 7/1990 | Möller et al. | 370/85.1 |
| 4,987,317 | 1/1991 | Pournain et al. | 455/343 |
| 5,450,403 | 9/1995 | Ichii et al. | 370/85.1 |
| 5,513,175 | 4/1996 | Ichii et al. | 455/343 |

Primary Examiner—Temesghen Ghebretinsae
Attorney, Agent, or Firm—Frishauf, Holtz, Goodman, Langer & Chick, P.C.

[57] ABSTRACT

A multiplex transmission apparatus, having a communication control circuit for carrying out transmit-receive control of a frame of data transmitted through a bus, and an output port for outputting data in frame received by the communication control circuit. The multiplex transmission apparatus is operated by a power supply voltage supplied from a power supply circuit to perform data communication with another multiplex transmission apparatus via a bus. First and second low voltage detection circuits, when detecting preset voltage values $V_L$ and $V_R$ of a power supply voltage, reset the communication control circuit and the output port. This multiplex transmission apparatus keeps the output of the output port in a normal condition despite relatively small variations in the power supply voltage (i,e., where $V_L \geq$ power supply voltage $> V_R$).

5 Claims, 7 Drawing Sheets

FIG. 5A POWER SUPPLY VOLTAGE

FIG. 5B POWER ON RESET

MULTIPLE TRANSMISSION APPARATUS

BACKGROUND OF THE INVENTION

1. FIELD OF THE INVENTION

The present invention relates to a multiple transmission apparatus connected to other multiple transmission apparatuses by a common transmission line to construct a multiple transmission system for carrying out data communications among the multiple transmission apparatuses.

2. DESCRIPTION OF THE RELATED ART

Figure 7:
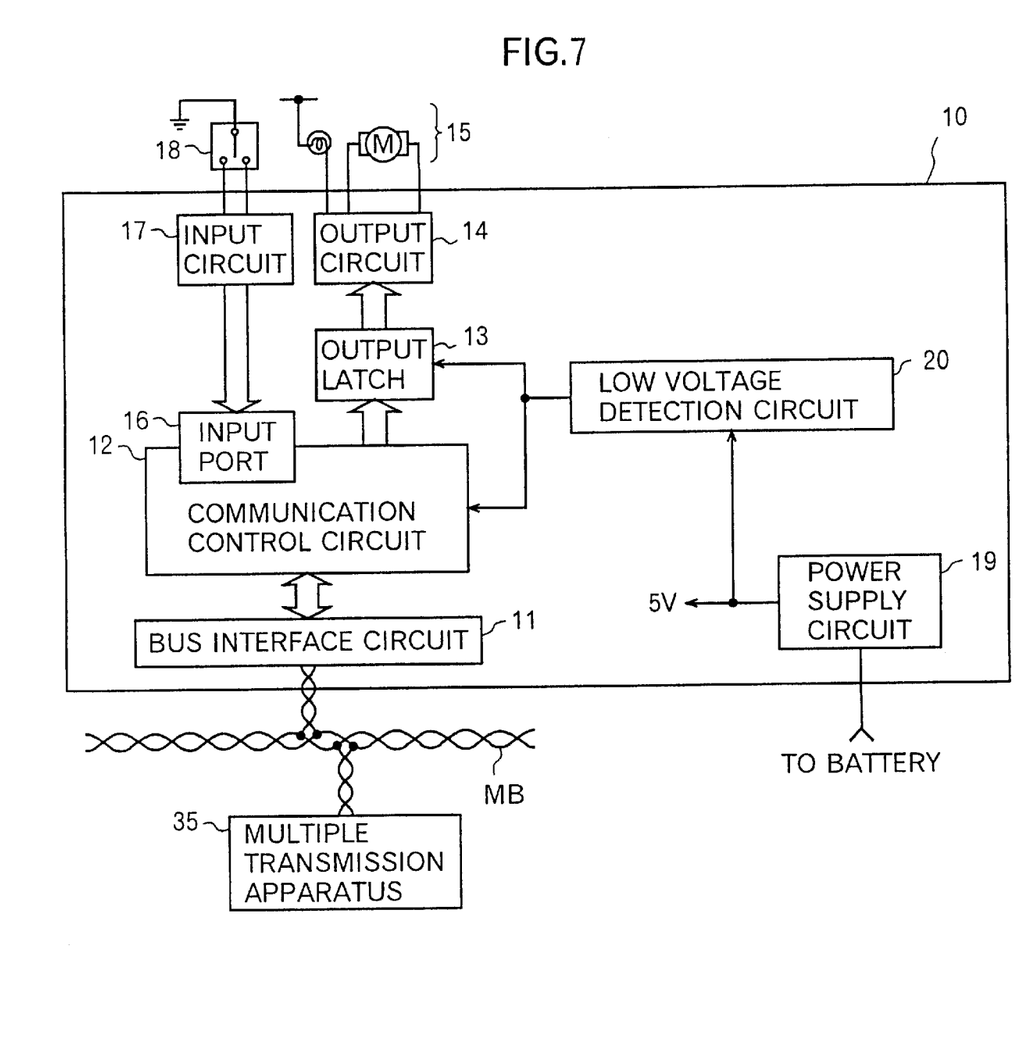
FIG. 7 is a block diagram showing a configuration of a multiple transmission apparatus of the related art.

The multiple transmission apparatus of this type has typically been configured as shown in the related art in FIG. 7. Referring to FIG. 7, the multiple transmission apparatus 10 comprises a bus interface circuit 11, a communication control circuit 12, an output latch 13, an output circuit 14, loads 15 such as a motor and a lamp, an input port 16, an input circuit 17, loads 18 such as various switches, a power supply circuit 19, and a low voltage detection circuit 20.

The multiple transmission apparatus 10 is connected to a transmission line MB of a multiple transmission system via the bus interface circuit 11. Data is transmitted in a frame form between the multiple transmission apparatus 10 and another multiple transmission apparatus 35 via the transmission line (bus) MB.

In this multiple transmission apparatus 10, power is supplied from an external battery, and a 5 V power supply voltage is supplied to the circuits in the apparatus by the power supply circuit 19. The low voltage detection circuit 20 is connected to the power supply circuit 19, the communication control circuit 12, and the output latch 13. The low voltage detection circuit 20 operates so that when it detects that the supplied power supply voltage decreases to a predetermined voltage value at which the multiple transmission apparatus cannot operate normally, the communication control circuit 12 and the output latch 13 are reset by the output of the low voltage detection circuit 20, thereby preventing erroneous operation of the multiple transmission apparatus.

In the multiple transmission apparatus, a power supply voltage threshold (hereinafter called "reset voltage") used for avoiding erroneous operation is set to a voltage value at which even part of the circuitry in the apparatus may possibly fail to operate normally. For example, in the case where this multiple transmission apparatus is used in a multiple transmission system for an automotive electrical system, at the time of starter motor rotation (hereinafter called "cranking") at engine start, much current flows, so that the battery voltage decreases. As a result, the power supply voltage may decrease to the reset voltage in the multiple transmission apparatus, so that the whole of the apparatus is reset each time the power supply voltage decreases to the reset voltage.

Here, a system is considered in which a head lamp, which is the load 15, is driven by this multiple transmission apparatus 10. In this system, when a head lamp ON signal is received from the transmission line MB, a high level signal is outputted to the output latch 13, so that the head lamp comes on. In the case where the power supply voltage is decreased by cranking when the head lamp comes on, the multiple transmission apparatus 10 is reset, so that the output latch 13 is reduced to a low level. Therefore, the head lamp is turned off.

To overcome this problem, some consideration is needed; for example, the capacitor capacity of the power supply circuit in the multiple transmission apparatus must be increased to decrease the effect of the variation in power supply voltage of the external battery. This increases the cost of the multiple transmission apparatus. In the case where the capacitor capacity of the power supply circuit is not changed, there arises a restriction on system design; for example, the data transmission signals are limited only to those that are not affected by the reset at the time of cranking.

SUMMARY OF THE INVENTION

The present invention was made to solve the above problems. Accordingly, an object of the present invention is to provide a multiple transmission apparatus in which the system design is facilitated against fluctuations in power supply voltage, whereby erroneous operation is prevented.

Another object of the present invention is to keep an output of the output port in a normal condition despite a relatively small variation in power supply voltage.

Still another object of the present invention is to keep a reset condition for a certain time at the start of 94 operation of the power source.

The above objects are achieved by the multiple transmission apparatus of the present invention. This multiple transmission apparatus, which is connected to another multiple transmission apparatus via a common transmission line, has communication control means for carrying out receive control of data formed into a frame transmitted to the transmission line, and port means for outputting data in frame received by the communication control means. The multiple transmission apparatus is operated by power supply voltages supplied from power supply means to carry out data communication with another multiple transmission apparatus. The multiple transmission apparatus provides first condition setting means for detecting a preset first voltage of the power supply voltages and for setting the port means and communication control means in the initial condition in accordance with the detection result and second condition setting means for detecting a preset second voltage of the power supply voltages and for keeping the port means in the operating condition and setting the communication control means in the initial condition in accordance with the detection result.

According to this multiple transmission apparatus, the individual parts (an output port and a communication control circuit) of the multiple transmission apparatus are set in the operating condition or the reset condition in accordance with the preset voltage values of two stages of power supply voltage (the first and second voltages). Thereupon, for example, when this multiple transmission apparatus is used for data transmission in an automobile, the port output is kept to continue the control of loads without the erroneous operation of multiple transmission apparatus even if the power supply voltage decreases at the time of cranking.

Preferably, the multiple transmission apparatus has delay means for detecting the start of operation of the power supply means and for delaying the condition setting operation performed by the second condition setting means in accordance with the detection result.

According to this multiple transmission apparatus, the reset condition can be released after a certain time from the start of operation of power source.

The multiple transmission apparatus provides monitoring and control means for performing monitoring and control of the individual parts of the multiple transmission apparatus, first condition setting means for detecting a preset first voltage of the power supply voltages and for setting the port means, communication control means, and monitoring and control means in the initial condition in accordance with the detection result, and second condition setting means for detecting a preset second voltage of the power supply voltages and for keeping the port means in the operating condition and setting the communication control means and monitoring and control means in the initial condition in accordance with the detection result.

According to this multiple transmission apparatus, a CPU core, together with the output port and the communication control circuit, can be set in the operating condition or the reset condition.

Preferably, in the multiple transmission apparatus, when the power supply voltage is not higher than the first voltage, the first voltage is set at a voltage value at which the port means and communication control means cannot operate normally, and the first condition setting means detects that the power supply voltage is not higher than the first voltage value.

Preferably, in the multiple transmission apparatus, when the power supply voltage is not higher than the second voltage, the second voltage is set at a voltage value at which the communication control means cannot operate normally and which is higher than the first voltage, and the second condition setting means detects that the power supply voltage is not higher than the second voltage value.

DESCRIPTION OF THE PREFERRED EMBODIMENT

The embodiments of the present invention will be described with reference to FIGS. 1 to 6.

Figure 1:
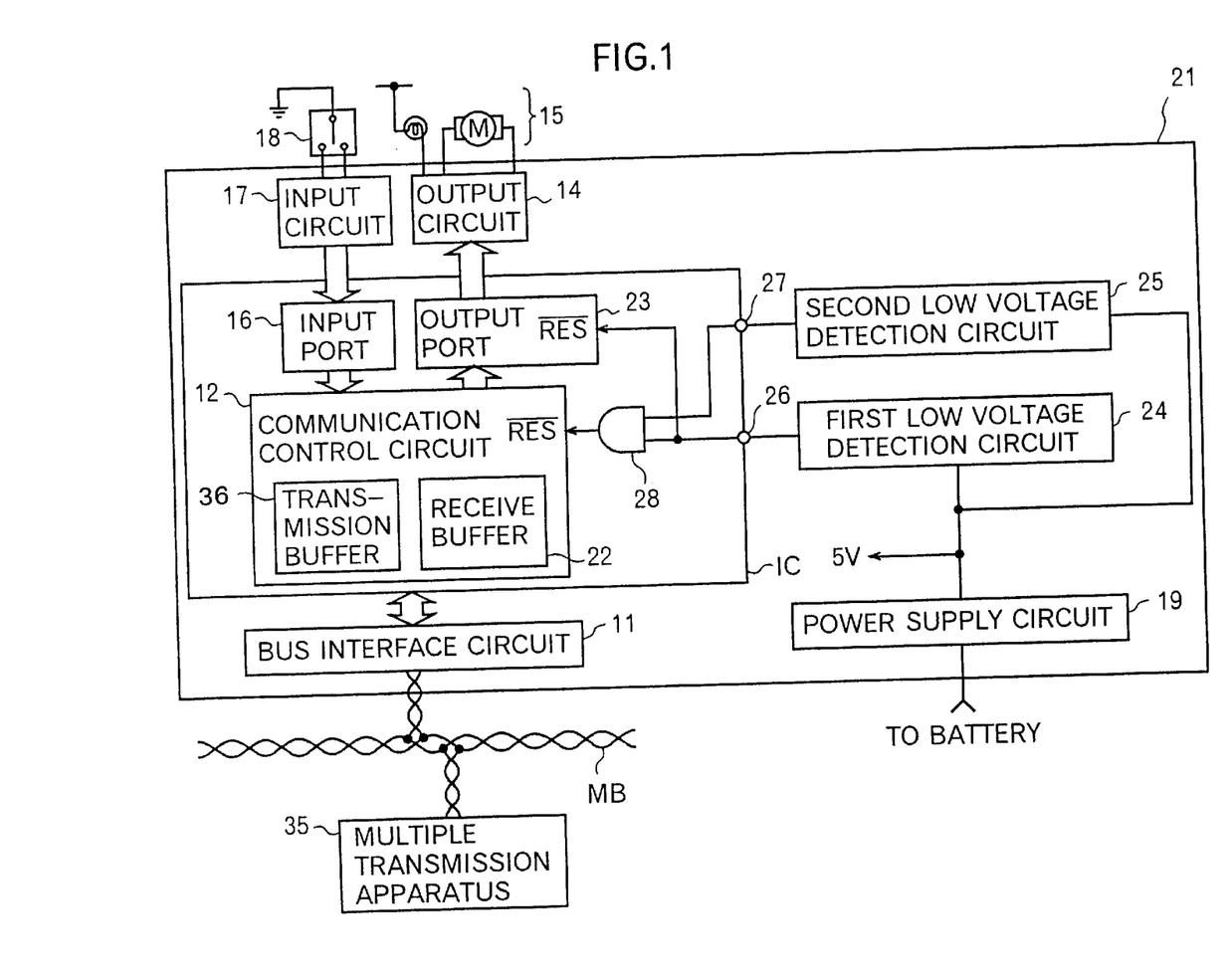
FIG. 1 is a block diagram of a first embodiment showing a configuration of a multiple transmission apparatus in accordance with the present invention.

FIG. 1 is a block diagram of a first embodiment showing a configuration of a multiple transmission apparatus in accordance with the present invention. In FIGS. 1 to 6, the similar reference numerals refer to the similar elements in FIG. 7 for convenience of explanation.

Referring now to FIG. 1, a multiple transmission apparatus 21 is connected to a transmission line MB via the bus interface circuit 11. Data is transmitted in a frame form between the multiple transmission apparatus 21 and another multiple transmission apparatus 35 via the transmission line MB.

The multiple transmission apparatus 21 comprises a bus interface circuit 11, a communication control circuit 12, an output circuit 14, an input port 16, an input circuit 17, a transmission buffer memory (hereinafter called "transmission buffer") 36 for storing transmitted data, a receive buffer memory (hereinafter called "receive buffer") 22 for storing received data, an output port 23, low voltage detection circuits 24 and 25 for detecting the power supply voltage from a power supply circuit 19, input terminals 26 and 27, and a logical product (hereinafter called "AND") circuit 28. The communication control circuit 12, the input port 16, the transmission buffer 36, the receive buffer 22, the output port 23, and the AND circuit 28 can be configured by one communication IC.

The input port 16 takes the data from various switches 18 etc., which are loads, via the input circuit 17 as a parallel signal. When part or whole of one or plural data items input to the input port 16 are changed, the data items are once transferred to the transmission buffer 36. The data items are formed into a frame by a preset communication procedure of the communication control circuit 12, and transmitted to the bus MB via the bus interface circuit 11.

On the other hand, the multiple transmission apparatus 21 takes the data transmitted from another multiple transmission apparatus 35 connected to the bus MB via the bus MB, and interprets the content of the data. The multiple transmission apparatus 21 temporarily stores the data necessary for the apparatus itself to the receive buffer 22. The stored data is outputted to a desired load via the output port 23 and the output circuit 14. Thereby, the load 15 such as a motor and a lamp is driven.

Figure 2:
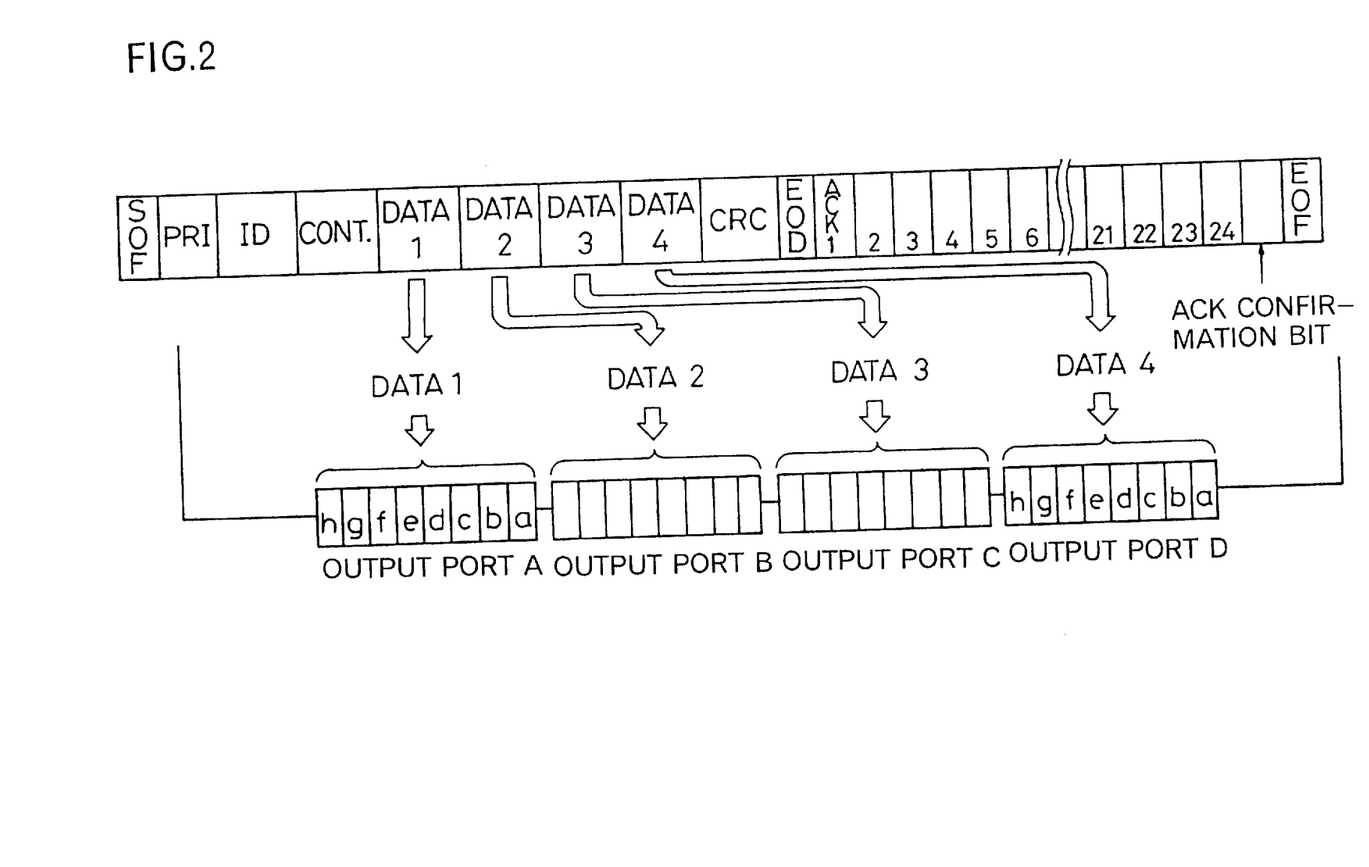
FIG. 2 is a block diagram showing one example of the format of data frame transmitted between multiple transmission apparatuses, and one example of the relationship between received data and output ports.

FIG. 2 is a block diagram showing one example of the format of data frame transmitted between multiple transmission apparatuses, and one example of the relationship between received data and output ports.

Referring to FIG. 2, the data frame is made up of SOF (Start of Frame), priority (PRI), control data field (CONT), ID, DATA, CRC, EOD (End of Data), acknowledgment signal (hereinafter called "ACK signal") field, ACK confirmation bit field, and EOF (End of Frame).

The SOF indicates the start of frame. The PRI determines the priority when a plurality of multiple transmission apparatus send data to the bus MB at the same time. The CONT contains data indicating a data length. The ID indicates the contents of DATA1 to DATA4 which follow. The DATA is a data field of a length (variable length) shown in the CONT, consisting of DATA1 to DATA4 of, for example, eight bits each. The CRC is an error check code. The EOD indicates the end of data. The ACK signal field is a field of, for example, 24 bits for returning the ACK signal from all multiple transmission apparatuses bit by bit. The ACK confirmation bit field is a one bit field for indicating that the ACK signal is returned from all registered multiple transmission apparatuses and the data transmission is completed. The EOF indicates the end of frame The data output from the output port 23 is such that the data held by a latch circuit etc. is outputted from an output buffer to the output circuit 14, for example, consisting of four ports: output ports A to D. The data in DATA1 to DATA4 are provided so as to be outputted from the corresponding output ports A to D, each consisting of 8 bits (refer to FIG. 2).

In this multiple transmission apparatus 21, like the apparatus of the related art, power is supplied from an external battery, and a 5 V power supply voltage is supplied to the circuits in the apparatus by the power supply circuit 19. In addition, the power supply voltage from the power supply circuit 19 is taken by the first and second low voltage detection circuits 24 and 25.

The first low voltage detection circuit 24 is connected to the output port 23, and also connected to the communication control circuit 12 via the AND circuit 28. The first low voltage detection circuit 24 determines whether the value of the taken power supply voltage has become a value not higher than the predetermined set voltage $V_R$ due to an abnormal variation.

If the power supply voltage value is a value not higher than the set voltage $V_R$, the first low voltage detection circuit 24 outputs a detection signal of low level (hereinafter called "L") to the output port 23 and the AND circuit 28. If the power supply voltage value is a value higher than the set voltage $V_R$, the first low voltage detection circuit 24 outputs a detection signal of high level (hereinafter called "H") to the output port 23 and the AND circuit 28.

The second low voltage detection circuit 25 is connected to the communication control circuit 12 via the AND circuit 28. The second low voltage detection circuit 25 determines whether the value of the taken power supply voltage has become a value not higher than the predetermined set voltage $V_L$ due to an abnormal variation.

If the power supply voltage value is a value not higher than the set voltage $V_L$, the second low voltage detection circuit 25 outputs a detection signal of "L" to the AND circuit 28. If the power supply voltage value is a value higher than the set voltage $V_L$, the second low voltage detection circuit 25 outputs a detection signal of "H" to the AND circuit 28.

The power supply voltage outputted from the power supply circuit 19 is about 5 V in the normal condition where there is no voltage variation. In the multiple transmission apparatus of this embodiment, normal operation is possible when the power supply voltage is higher than $V_L$. If $V_L \geq$ power supply voltage $> V_R$, the output of the output port 23 can be kept in the normal condition. If the power supply voltage is not higher than $V_R$, the output port 23 cannot be kept in the normal condition. Here, the relationship of set voltage $V_L >$ set voltage $V_R$ holds. In this embodiment, $V_L$ is set at about 4.5 V, and $V_R$ at about 2.5 V, for example.

The AND circuit 28 takes a logical product of detection signals inputted from the low voltage detection circuits 24 and 25 via the input terminals 26 and 27, respectively, and outputs the operation result to the communication control circuit 12.

The communication control circuit 12 is set so as to be reset by an "L" signal inputted via the AND circuit 28. Also, the output port 23 is set so as to be reset by an "L" signal inputted from the first low voltage detection circuit 24. That is to say, the communication control circuit 12 is reset to the initial condition by any of the detection outputs of the low voltage detection circuits 24 and 25 if the power supply voltage is not higher than $V_L$. The output port 23 is reset to in the initial condition by the detection output of the low voltage detection circuit 24 if power supply voltage is not higher than $V_R$.

Next, the reset operation of the multiple transmission apparatus of this first embodiment will be described with reference to the waveform diagram of FIG. 3.

Figure 3A:
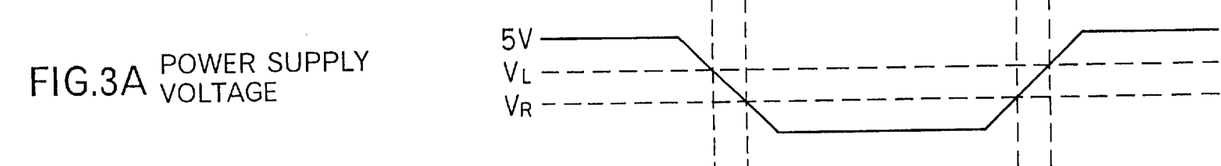
FIGS. 3A to 3D are waveform diagrams showing the output of each circuit corresponding to the variation in power supply voltage from the power supply circuit shown in FIG. 1.

First, referring to FIG. 3A, let us consider a situation where in the multiple transmission apparatus of the first embodiment, an abnormal variation in power supply voltage occurs for some reason, and the voltage value changes from 5 V to a value not higher than the set voltage $V_L$ (in the range of $V_L \geq$ power supply voltage $> V_R$).

Figure 3B:
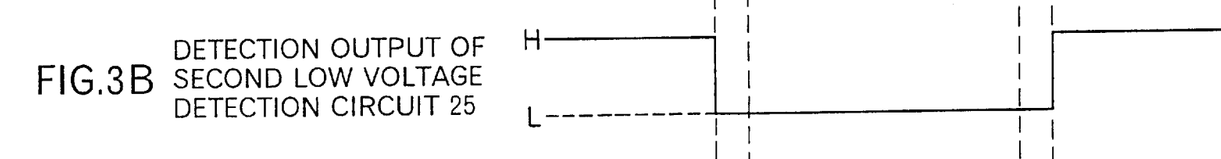

Then, an "L" detection signal is outputted from the second low voltage detection circuit 25 to the AND circuit 28 via the input terminal 27 (refer to FIG. 3B). At the same time, an "H" detection signal is outputted from the first low voltage detection circuit 24 to the output port 23 and the AND circuit 28 via the input terminal 26 (refer to FIG. 3C).

Figure 3C:
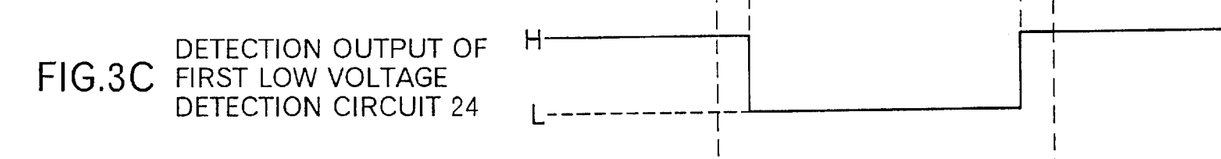
Figure 3D:
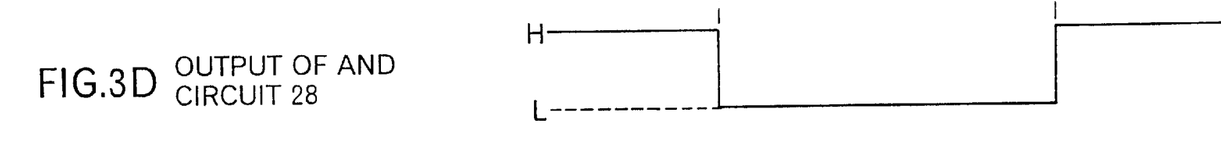

The AND circuit 28 performs a logical operation on the basis of the detection outputs of both low voltage detection circuits 24 and 25, and outputs an "L" signal (reset signal) shown in FIG. 3D to the communication control circuit 12.

Thereupon, the output port 23 is not reset and kept in the operating condition, while the communication control circuit 12 is reset to the initial condition.

If the power supply voltage decreases to a value not higher than the set voltage $V_R$ (refer to FIG. 3A), at which the multiple transmission apparatus may become impossible to operate normally for any reason, an "L" level detection signal is outputted from the first low voltage detection circuit 24 in addition to the second low voltage detection circuit 25 (refer to FIG. 3C). This detection signal is inputted to the output port 23 and the AND circuit 28.

The AND circuit 28 performs a logical operation on the basis of the detection outputs from both low voltage detection circuits 24,25, and outputs an "L" reset signal to the communication control circuit 12. Therefore, the "L" signal (reset signal) is inputted to both the communication control circuit 12 and the output port 23, so that both of the communication control circuit 12 and the output port 23 are reset to the initial condition.

Thereupon, in this embodiment, if the power supply voltage has such a value that the communication control circuit may be impossible to perform normal communication control, (if $V_L \geq$ power supply voltage $> V_R$), the communication control circuit is reset, and the output port is kept in the normal condition. Also, in this embodiment, if the power supply voltage has such a value that the multiple transmission apparatus may be impossible to operate normally (if power supply voltage $\leq V_R$), the communication control circuit and the output port are reset. For this reason, in this embodiment, when there occurs a relatively small variation in power supply voltage, the output of the output port is kept in a normal condition despite, so that the control of loads can be continued without the erroneous operation of the multiple transmission apparatus. Therefore, this embodiment facilitates the system design and makes it possible to increase the number of signals for data transmission.

Further, the multiple transmission apparatus of this embodiment can be used, for example, in a multiple transmission system of 94 automotive electrical system, in which abnormal variations of power supply voltage are easily caused by cranking etc. In this case as well, the erroneous operation of multiple transmission apparatus can be prevented and the communication property of data transmission can be improved.

Figure 4:
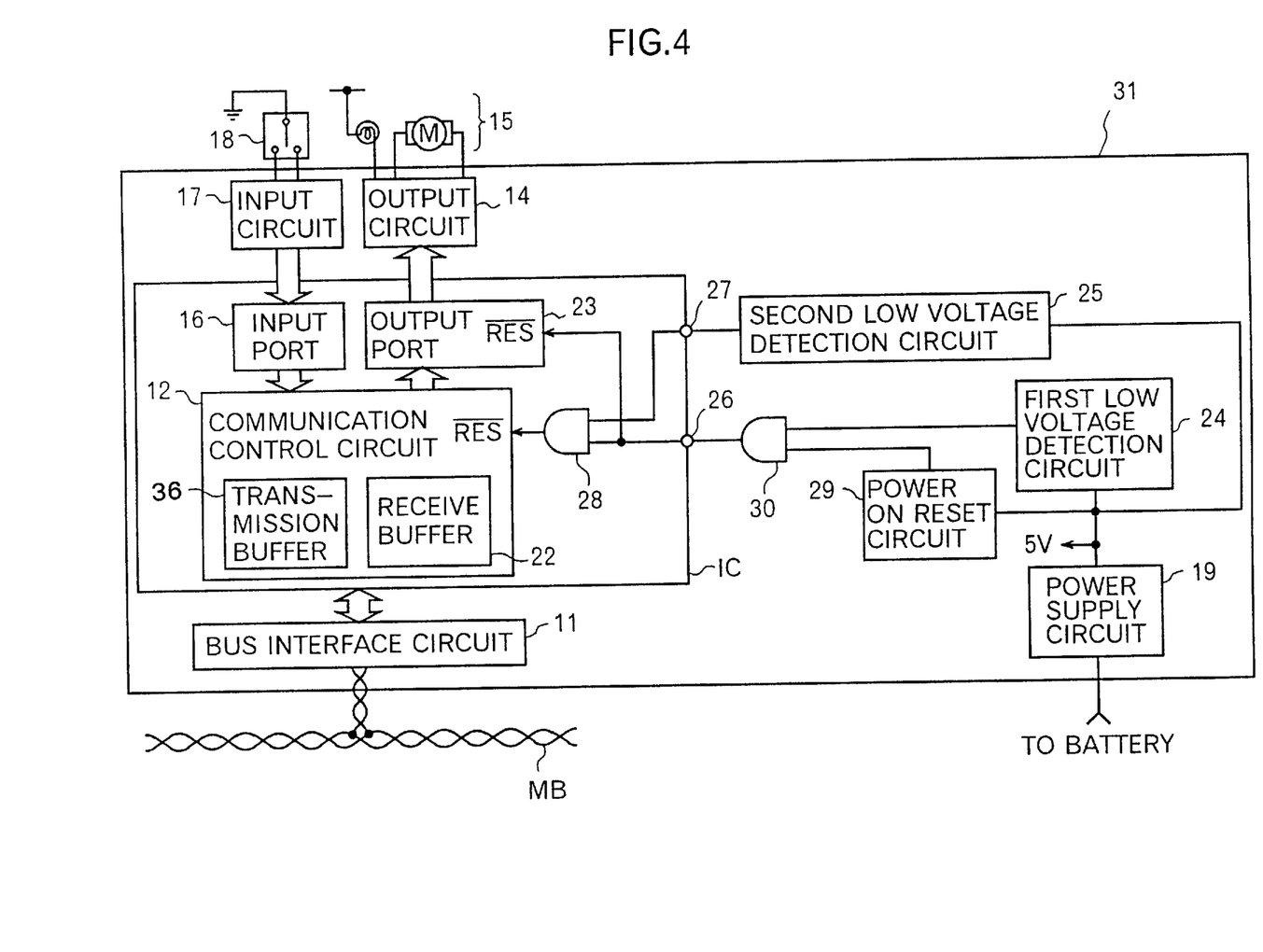
FIG. 4 is a block diagram of a second embodiment showing a configuration of a multiple transmission apparatus in accordance with the present invention.

FIG. 4 is a block diagram of a second embodiment showing a configuration of a multiple transmission apparatus in accordance with the present invention.

Referring to FIG. 4, the configuration of the second embodiment differs from that of the first embodiment shown in FIG. 1 in that a power on reset circuit 29 and an AND circuit 30, which inputs signals from the first low voltage detection circuit 24 and the power on reset circuit 29, are added.

In the multiple transmission apparatus 31 of this embodiment, the power on reset circuit 29 is connected to the power supply circuit 19 so that when the power is on, the reset condition is released after a predetermined time $T_W$ has elapsed from the time when the power supply voltage increases to the set voltage. At the start of the operation of power source, the power supply voltage is unstable, so that there is a possibility of erroneous operation of multiple transmission apparatus. To eliminate this possibility, in this embodiment, the power on reset circuit 29 is set so that when the power is on, the reset condition is kept even when the power supply voltage increases to the set voltage, and the reset condition is released after a time for stabilizing the power supply voltage has elapsed.

The power on reset circuit 29 determines whether the voltage value of the inputted power supply voltage is higher than the set voltage, for example, $V_R$. If the inputted power supply voltage is higher than $V_R$, the power on reset circuit 29 outputs an "H" signal (reset release signal) to the AND circuit 30 after the predetermined time $T_W$, which is counted by the timer function in the power on reset circuit 29, has elapsed. The set voltage set in the power on reset circuit 29 may be any voltage value which can recognize the start of operation of power source. It is not limited to $V_R$, but can be set arbitrarily.

The AND circuit 30 takes a logical product of the signals inputted from the first low voltage detection circuit 24 and the power on reset circuit 29, and outputs the operation result to the output port 23 and the AND circuit 28.

Figures 5A, 5B:
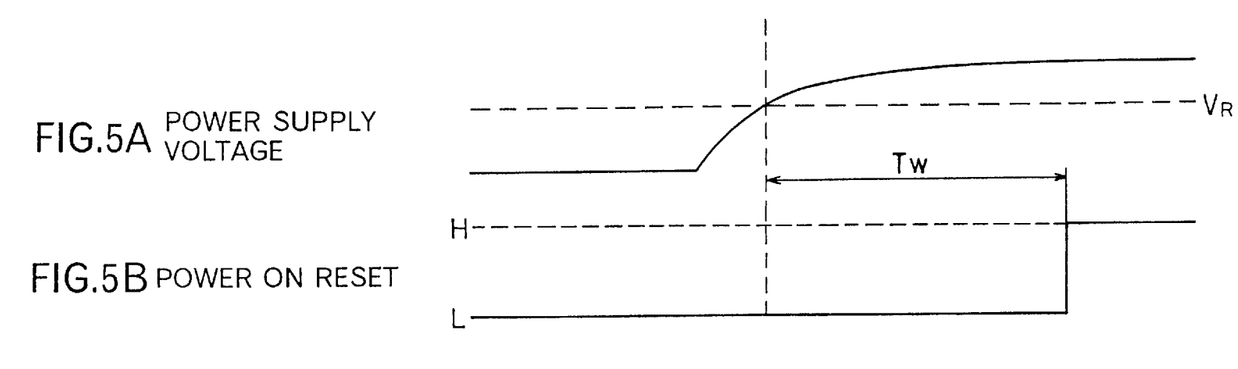
FIGS. 5A and 5B are waveform diagrams showing the output of a power on reset circuit corresponding to the variation in power supply voltage.

Referring to FIG. 5A, in this embodiment, when the power source is started up and the power supply voltage becomes higher than $V_R$, the first low voltage detection circuit 19 outputs an "H" detection signal to the AND circuit 30. At this time, the power on reset circuit 29 also detects that the power supply voltage is higher than $V_R$, but it does not immediately output a reset release signal. As shown in FIG. 5B, the power on reset circuit 29 outputs an "H" reset release signal to the AND circuit 30 after the predetermined time $T_W$ has elapsed.

The AND circuit 30 performs a logical operation on the basis of the detection outputs of the first low voltage detection circuit 19 and the power on reset circuit 29. The AND circuit 30 outputs an "L" reset signal before the time $T_W$ elapses, and outputs an "H" reset release signal after the time $T_W$ has elapsed. Thereby, the reset condition of the output port 23 is released after the time $T_W$ has elapsed from the start of operation of the power source.

For the communication control circuit, the reset condition is kept if an "L" detection signal is outputted from the second low voltage detection signal 25 when a reset release signal is outputted from the AND circuit 30, and the reset condition is released if an "H" detection signal is outputted.

Thereupon, in this embodiment, the reset condition of the output port can be released after the predetermined time has elapsed from the start of operation time of the power source when the power supply voltage is unstable. Therefore, by the release of the reset condition, the output of the output port becomes as in the normal state, which enables the control of loads, thereby preventing the erroneous operation of the multiple transmission apparatus.

Figure 6:
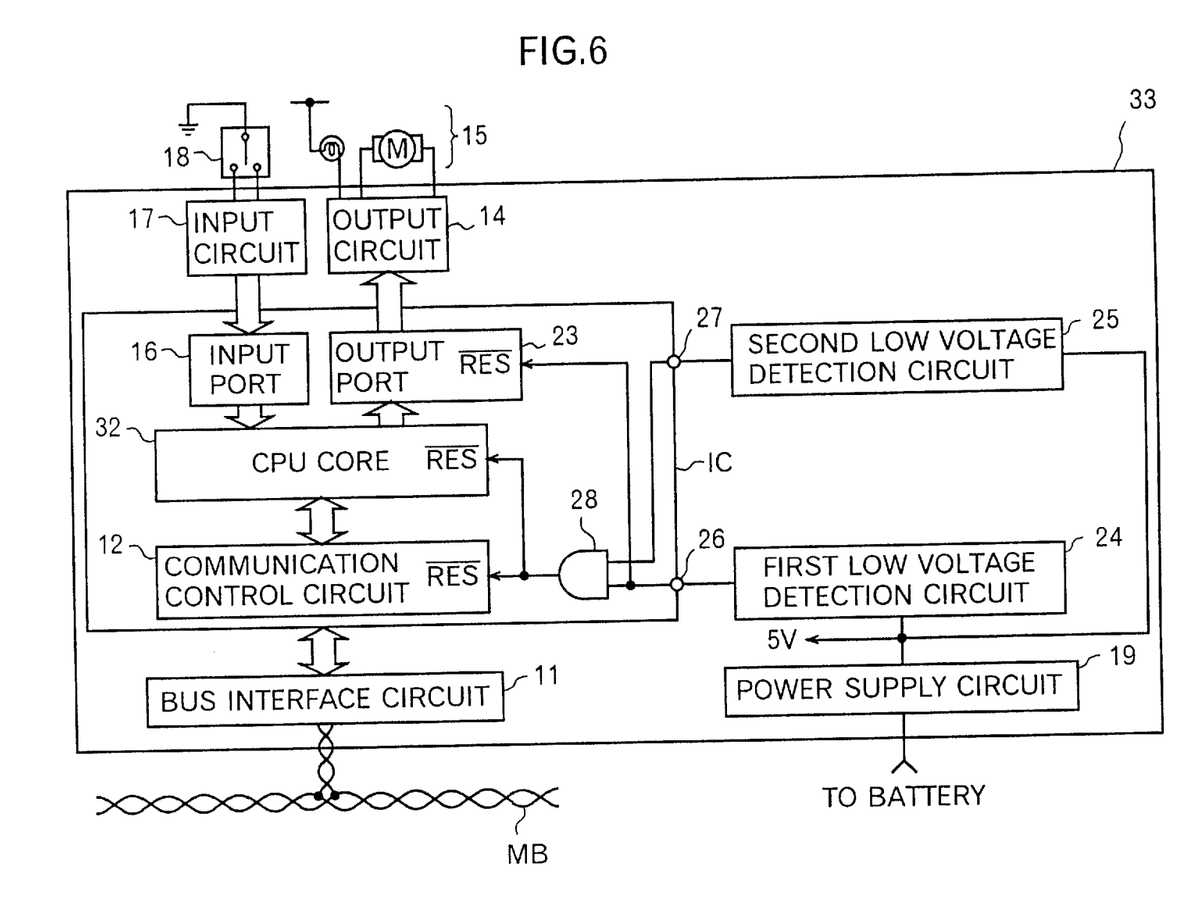
FIG. 6 is a block diagram of a third embodiment showing a configuration of a multiple transmission apparatus in accordance with the present invention.

FIG. 6 is a block diagram of a third embodiment showing a configuration of a multiple transmission apparatus in accordance with the present invention.

Referring to FIG. 6, the configuration of the third embodiment differs from that of the first embodiment shown in FIG. 1 in that the multiple transmission apparatus is so configured that a CPU core 32 is reset together with the communication control circuit 12. This CPU core 32 has control functions such as the ACK monitoring function for monitoring the ACK signals returned from all registered multiple transmission apparatuses, the load control function on the basis of received data, and the control function for transmission request to the communication control circuit 12. The communication control circuit 12, the input port 16, the output port 23, the AND circuit 28, and the CPU core 32 can be formed by one communication IC.

In the multiple transmission apparatus 33, when the power supply voltage is higher than $V_L$, normal operation is possible, but when the power supply voltage is not higher than $V_L$, the CPU core 32 may erroneously operates with respect to the communication control circuit 12. Therefore, the apparatus of this embodiment is so configured that the logical operation result of the AND circuit 28 is outputted to the communication control circuit 12 and the CPU core 32.

Thus, in the multiple transmission apparatus 33 of this embodiment, when the power supply voltage is not higher than $V_L$, the output port 23 is not reset, and is kept in the operating condition, so that the control of loads can be continued. However, the communication control circuit 12 and the CPU core 32 are reset to the initial condition by an "L" reset signal inputted from the second low voltage detection circuit 25 via the AND circuit 28. When the power supply voltage is not higher than $V_R$, the output port 23 is also reset together with the communication control circuit 12 and the CPU core 32.

Thus, in this embodiment, the communication control circuit and the CPU core can be reset by the detection output of either of the first low voltage detection circuit and the second low voltage detection circuit. In this embodiment, therefore, the erroneous operation of the multiple transmission apparatus can be prevented, and the communication property of data transmission can be improved.

In this embodiment, the topology of the transmission line can be applied to any type such as bus type, ring type, or star type.

What is claimed is:

1. A multiplex transmission apparatus which can be connected to at least one other multiplex transmission apparatus by a common transmission line for carrying out data communication, said multiplex transmission apparatus comprising:

a power supply for applying a power supply voltage to individual components of said multiplex transmission apparatus;

a communication control circuit for carrying out receive control of a frame of data transmitted through said common transmission line;

an output port for outputting data in frame received by said communication control circuit;

a first condition setting circuit for detecting a preset first voltage of said power supply voltage, and for setting said output port and said communication control circuit in an initial condition in accordance with the detected preset first voltage; and a second condition setting circuit for detecting a preset second voltage of said power supply voltage, and for keeping said output port in an operating condition and setting said communication control circuit in said initial condition in accordance with the detected preset second voltage.

2. A multiplex transmission apparatus which can be connected to at least one other multiplex transmission apparatus by a common transmission line for carrying out data communication, said multiplex transmission apparatus comprising:

a power supply for applying a power supply voltage to individual components of said multiplex transmission apparatus;

a communication control circuit for carrying out receive control of a frame of data transmitted through said common transmission line;

an output port for outputting data in frame received by said communication control circuit;

a first condition setting circuit for detecting a preset first voltage of said power supply voltage, and for setting said output port and said communication control circuit in an initial condition in accordance with the detected preset first voltage;

a second condition setting circuit for detecting a preset second voltage of said power supply voltage, and for keeping said output port in an operating condition and setting said communication control circuit in said initial condition in accordance with the detected preset second voltage; and a delay circuit for detecting a start of operation of said power supply, and for delaying operation of said second condition setting circuit in accordance with the detected start of operation of said power supply.

3. A multiplex transmission apparatus which can be connected to at least one other multiplex transmission apparatus by a common transmission line for carrying out data communication, said multiplex transmission apparatus comprising:

a power supply for applying a power supply voltage to individual components of said multiplex transmission apparatus;

a communication control circuit for carrying out receive control of a frame of data transmitted through said common transmission line;

an output port for outputting data in frame received by said communication control circuit;

a monitoring and control circuit for monitoring and controlling said individual components of said multiplex transmission apparatus;

a first condition setting circuit for detecting a preset first voltage of said power supply voltage, and for setting said output port, said communication control circuit and said monitoring and control circuit in an initial condition in accordance with the detected preset first voltage; and a second condition setting circuit for detecting a preset second voltage of said power supply voltage, and for keeping said output port in an operating condition and setting said communication control circuit and said monitoring and control circuit in said initial condition in accordance with the detected preset second voltage.

4. The multiple transmission apparatus according to claims 1, 2 or 3, wherein when said power supply voltage is not higher than said preset first voltage, said preset first voltage is set at a voltage value at which said output port and said communication control circuit cannot operate normally, and said first condition setting circuit detects that said power supply voltage is not higher than said preset first voltage.

5. The multiple transmission apparatus according to claims 1, 2, or 3, wherein when said power supply voltage is not higher than said preset second voltage, said preset second voltage is set at a voltage value at which said communication control circuit cannot operate normally and which is higher than said preset first voltage, and said second condition setting circuit detects that said power supply voltage is not higher than said preset second voltage.

\* \* \* \* \*